(12) United States Patent
Barsotti et al.

(10) Patent No.: US 6,861,495 B2
(45) Date of Patent: Mar. 1, 2005

(54) LACQUERS CONTAINING HIGHLY BRANCHED COPOLYESTER POLYOL

(75) Inventors: Robert John Barsotti, Franklinville, NJ (US); Carl Brent Douglas, Boothwyn, PA (US); Renee Jeanne Kelly, Media, PA (US); Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 29 days.

(21) Appl. No.: 10/370,400

(22) Filed: Feb. 19, 2003

(65) Prior Publication Data

US 2003/0161961 A1 Aug. 28, 2003

Related U.S. Application Data

(60) Provisional application No. 60/359,013, filed on Feb. 20, 2002.

(51) Int. Cl.$^7$ .............................................. C08G 63/02
(52) U.S. Cl. .................. 528/272; 252/182.25; 525/440; 528/193; 528/303
(58) Field of Search .................... 252/182.25; 525/440; 528/193, 303, 272

(56) References Cited

U.S. PATENT DOCUMENTS

| | | |
|---|---|---|
| 3,585,160 A | 6/1971 | Miller et al. |
| 4,242,243 A | 12/1980 | Antonelli et al. |
| 4,692,481 A | 9/1987 | Kelly |
| 4,849,480 A | 7/1989 | Antonelli et al. |
| 5,010,140 A | 4/1991 | Antonelli et al. |
| 5,279,862 A | 1/1994 | Corcoran et al. |
| 5,418,301 A | 5/1995 | Hult et al. |
| 5,663,247 A | 9/1997 | Sorensen et al. |
| 5,763,528 A | 6/1998 | Barsotti et al. |
| 5,990,260 A | 11/1999 | Pettersson |
| 6,093,777 A | 7/2000 | Sorensen et al. |
| 6,114,458 A | 9/2000 | Hawker et al. |
| 6,114,489 A | 9/2000 | Vicari et al. |
| 6,162,891 A | * 12/2000 | Wamprecht et al. ........ 528/303 |
| 6,211,329 B1 | 4/2001 | Rehnberg et al. |
| 6,221,494 B1 | 4/2001 | Barsotti et al. |
| 6,284,233 B1 | 9/2001 | Simon et al. |

FOREIGN PATENT DOCUMENTS

| | | |
|---|---|---|
| EP | 1070748 A1 | 1/2001 |
| WO | WO 9723538 A | 7/1997 |
| WO | WO 01/46296 A1 | 6/2001 |
| WO | WO 03/070844 A1 | 8/2003 |

OTHER PUBLICATIONS

Tomalia et al., Starburst Dendrimers: Molecular–Level Control of Size, Shape, Surface Chemistry, Topology, and Flexibility from Atoms to Macroscopie Matter, Angew. Chem. Int. Ed. Engl., 1990, vol. 29, pp. 138–175.

Copy of the International Search Report, International Application No. PCT/US 03/04882.

* cited by examiner

*Primary Examiner*—Terressa Boykin
(74) *Attorney, Agent, or Firm*—Sudhir G. Deshmukh

(57) ABSTRACT

This invention relates to rapid drying lacquers that are particularly useful for automotive OEM refinish applications. The lacquer includes a novel highly branched copolyester polyol. This invention is also directed to a process for producing coatings from the rapid drying lacquers. These lacquers are especially useful in providing for chip and humidity resistant coatings having improved adhesion.

23 Claims, No Drawings

LACQUERS CONTAINING HIGHLY BRANCHED COPOLYESTER POLYOL

CROSS REFERENCE TO RELATED APPLICATION

This application claims benefit of U.S. provisional No. 60/359,013 filed on Feb. 20, 2002.

BACKGROUND OF THE INVENTION

1. Field of the Invention

This invention relates to rapid drying lacquers that are particularly useful for automotive refinish and for automotive OEM (Original Equipment Manufacture) applications.

2. Description of the Prior Art

The typical finish on an automobile or truck body comprises an electrodeposited primer layer, an optional primer or primer surfacer layer over the electrodeposited layer and then a pigmented base coat layer and over the pigmented base coat layer, a clear coat layer is applied. A pigmented mono-coat may be used in place of the base coat/clear coat. A number of clear and pigmented lacquers have been utilized as automotive OEM and automotive refinish coatings, such as, primers, basecoats and clear coats but none meet the rapid drying times that are desired in combination with outstanding physical properties, such as, chip and humidity resistance and adhesion.

In refinishing automobiles and trucks, the damaged painted areas having dents, mars and scratches and the like are sanded or ground out by mechanical means in and around the damaged area. Sometimes the original coating is stripped off from a portion or off the entire auto or truck body to expose the substrate (e.g., bare metal) underneath. After repairing the damage, the repaired surface is coated and applied layers are dried and cured.

A key concern to a refinish customer is that the coating in use has excellent physical properties, such as chip and humidity resistance, and adhesion.

Another key concern of the automobile and truck refinish industry is productivity, i.e., the ability to complete an entire refinish operation in the least amount of time. To accomplish a high level of productivity, any coatings applied need to have the ability to dry at ambient or elevated temperature conditions in a relatively short period of time. The term "dry" means that the resulting finish is physically dry to the touch in a relatively short period of time to minimize dirt pick-up, and, in the case of the basecoat, to allow for the application of the subsequent clear coat.

Current commercially available lacquers do not have these unique characteristics of rapidly drying under ambient temperature conditions along with the ability to form a finish having improved chip and humidity resistance and adhesion. It would be advantageous to have a lacquer with this unique combination of properties.

STATEMENT OF THE INVENTION

This invention is directed to a lacquer comprising a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20.

This invention is further directed to a process for producing a coating on the surface of a substrate, said process comprising:

applying a layer of a lacquer on said surface, said lacquer comprising a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and drying said layer to form said coating on said surface of said substrate.

DETAILED DESCRIPTION OF THE INVENTION

As used herein:

"Number average molecular weight" and "weight average molecular weight" are determined by gel permeation chromatography (GPC) using a high performance liquid chromatograph (HPLC) supplied by Hewlett-Packard, Palo Alto, Calif. Unless stated otherwise, the liquid phase used was tetrahydrofuran and the standard used was polymethyl methacrylate.

"Polydispersity" means weight average molecular weight divided by number average molecular weight.

"Polymer solids" or "Binder solids" means a polymer or binder in its dry state.

"Functionality" means the number average molecular weight (Mn) divided by the calculated functional group equivalent weight. The preferred functional group is a hydroxyl group. For example, the functionality of a highly branched copolyester polyol is the number average molecular weight (Mn) divided by the hydroxyl equivalent weight (HEW) or Mn/HEW.

"Free valency" means a bond site on a moiety (atom, group of atoms, functional group, radical, molecule, compound, oligomer or polymer) that is capable of forming a chemical bond to another atom, group of atoms, functional group, radical, molecule, compound, oligomer or polymer. For example, pentaerythritol provides a tetravalent pentyl radical having four free valencies connected to four hydroxyl groups. Trimethylolacetic acid provides a tetravalent butyl radical having four valencies connected to three hydroxyl groups and one carboxyl group. Dimethylolpropionic acid provides a trivalent butyl radical having three free valencies connected to two hydroxyl and one carboxyl group. Trimethylolpropane provides a trivalent hexyl radical having three free valencies connected to three hydroxyl groups. Caprolactone provides divalent pentyl radical having two free valencies connected to a divalent internal ester group.

"(Meth)acrylate" means acrylate and methacrylate.

"Tg" (glass transition temperature) measured in ° C. determined by DSC (Differential Scanning Calorimetry).

The present invention is directed to a lacquer suited for various coating processes, such as automotive OEM and automotive refinish. The novel lacquer is particularly well suited for use in automotive refinishing used for repairing or refinishing auto and truck bodies.

Highly Branched Copolyester Polyol

The novel lacquer of the present invention includes a highly branched copolyester polyol in the range of from 2 percent to 100 percent, preferably, in the range of from 5 percent to 50 percent, and most preferably in the range of from 10 percent to 40 percent; the percentages being in weight percentages based on the total weight of the lacquer solids.

The highly branched copolyester polyol has a number average molecular weight not exceeding 30,000, preferably in the range of from 1,000 to 30,000, more preferably in the range of 2,000 to 20,000, most preferably in the range of 5,000 to 15,000. The copolyester polyol has hydroxyl groups ranging from 5 to 200 per polymer chain, preferably 6 to 70, and more preferably 10 to 50, and carboxyl groups ranging from 0 to 40 per chain, preferably 1 to 40, more preferably 1 to 20 and most preferably 1 to 10. The Tg (glass transition temperature) of the copolyester polyol ranges from −70° C. to 50° C., preferably from −65° C. to 40° C., and more preferably from −60° C. to 30° C.

The highly branched copolyester polyol is conventionally polymerized from a monomer mixture containing a chain extender selected from the group consisting of a hydroxy carboxylic acid, a lactone of a hydroxy carboxylic acid and a combination thereof; and one or more hyper branching monomers.

Some of the suitable hydroxy carboxylic acids include glycolic acid; lactic acid; 3-hydroxycarboxylic acids, e.g., 3-hydroxypropionic acid, 3-hydroxybutyric acid, 3-hydroxyvaleric acid, and hydroxypyvalic acid.

Some of the suitable lactones include caprolactone, valerolactone; and lactones of the corresponding hydroxy carboxylic acids, such as, glycolic acid; lactic acid; 3-hydroxycarboxylic acids, e.g., 3-hydroxypropionic acid, 3-hydroxybutyric acid, 3-hydroxyvaleric acid, and hydroxypyvalic acid. Caprolactone is preferred.

Suitable hyper branching monomers include those having one carboxyl group and two hydroxyl groups, two carboxyl groups and one hydroxyl group, one carboxyl group and three hydroxyl groups, or three carboxyl groups and one hydroxyl group. The foregoing monomers can be structurally represented by the following structures wherein A is carboxyl and B is hydroxyl:

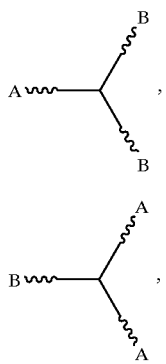

(1)

(2)

-continued

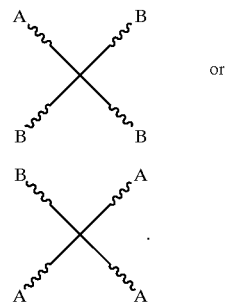

(3)

or (4)

It should be noted that even though that A and B groups in foregoing structures are shown in terminal position, it is contemplated these groups could be positioned anywhere in these structures. Some of the suitable hyper branching monomers include dialkylol propionic acid, preferably dimethylol propionic acid and diethylol propionic acid; trimethylolacetic acid; citric acid; malic acid; gluconic acid; and a combination thereof.

When the aforedescribed monomer mixture contains hyper branching monomer having two carboxyl groups and one hydroxyl group or three carboxyl groups and one hydroxyl group, the resulting highly branched copolyester polyol is further reacted with a monoepoxy, such as ethylene oxide, propylene oxide, epoxy butane, epoxycyclohexane, epoxydecane, and Glydexx® N-10, a mixed glycidyl ester from Exxon Chemicals, Houston, Tex.; a diol having one primary hydroxyl and one secondary or tertiary hydroxyl group, such as 2-ethyl, 1,3-hexane diol, 1,3-butane diol, 1,2-propane diol, or combination thereof; or a combination of the monoepoxy and diol to provide the highly branched copolyester polyol with the described range of hydroxyl groups. It should be understood that by controlling the amount of monoepoxy or diol used for post-reaction, some of the carboxyl groups on the resulting highly branched copolyester polyol can be left intact, thus providing the highly branched copolyester polyol with a desired range of carboxyl groups.

The weight ratio of the hyper branching monomer to the chain extender in the monomer mixture ranges from 1/0.3 to 1/20, preferably from 1/1 to 1/10 and more preferably from 1/1.5 to 1/4.

The monomer mixture can further include one or more molecular weight controlling agents having in the range of 1 to 6 functionalities selected from the group consisting of hydroxyl, amine, epoxide, carboxyl and a combination thereof. Some of the suitable molecular weight controlling agents can include polyhydric alcohols, such as ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol; polyalkylene glycol, such as, polyethylene glycol and polypropylene glycol. The preferred polyhydric alcohols are ditrimethylolpropane, trimethylolethane, trimethylolpropane and pentaerythritol. Monohydric alcohols can be also used, such as, cyclohexanol and 2-ethylhexanol.

Some of the suitable molecular weight controlling agents include epoxides such as, monoepoxides, e.g., ethylene oxide, propylene oxide, epoxy butanes, epoxycyclohexane, epoxydecane, and Glydexx® N-10, a mixed glycidyl ester from Exxon Chemicals, Houston, Tex. Polyepoxies also can be used, such as, glycidyl esters, for example, Araldite®CY-184 from Ciba Specialty Chemicals, Tarrytown, N.Y.

Cycloaliphatic epoxides and sorbitol gylcidyl ethers can be also used. Others that can be used are glycidyl ethers of Bisphenol A, glycidyl methacrylate copolymers, epichlorohydrine-polyols and epoxidized polyunsaturated compounds, e.g., epoxidized natural oils and epoxidized polybutadienes.

Some of the suitable molecular weight controlling agents can include monoamines, such as butyl amine, hexyl amine, and cyclohexyl amine; polyamines, such as ethylene diamine, hexamethylene diamine, diethylene triamine, and PACM diamine supplied by Airproducts Inc., Allentown, Pa., or combinations thereof.

Some of the suitable molecular weight controlling agents can include carboxylic acids, such as acetic, hexanoic, adipic, azelaic acids or combinations thereof. The carboxylic acids can have, for example, two carboxyl groups and two hydroxyl groups, such as tartaric acid.

Two preferred highly branched copolyester polyols are (1) the reaction product of dimethylol propionic acid and caprolactone, and (2) the reaction product of dimethylol propionic acid, caprolactone and pentaerythritol. These polyols produce lacquers that form coatings having excellent chip and humidity resistance, adhesion and rapid dry time.

The monomer mixture preferably includes dialkylol propionic acid, such as dimethylol propionic acid and caprolactone. The more preferred monomer mixture further includes pentaerythritol, trimethylol propane or more preferably pentaerythritol. A lacquer containing the resulting highly branched copolyester polyols forms coatings having excellent chip and humidity resistance, adhesion and rapid dry time.

The highly branched copolyester polyol can be produced by polymerizing, in one step, the monomer mixture that includes the chain extender and the highly branched monomers. If desired, the monomer mixture in the foregoing one step random polymerization process can also include the molecular weight controlling agent. One example of the resulting highly branched copolyester polyol produced by the one step process has the following structure:

Structure 1

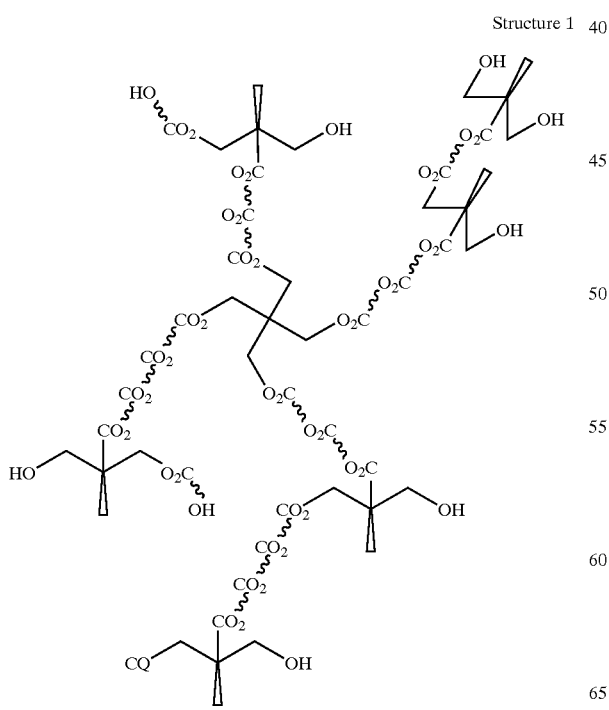

wherein the monomer mixture used to produce the highly branched copolyester polyol of Structure 1 includes, caprolactone as a chain extender, dimethylol propionic acid as a hyper branching monomer and pentaerythritol as a molecular weight controlling agent.

Alternatively, the highly branched copolyester polyol can be produced in stages by first polymerizing the highly branched monomers followed by polymerizing the chain extender. Thus, in the first step, the monomer mixture, which includes the highly branched monomers, is polymerized and then in the second step, the polymerization is continued with the addition of the chain extender.

In another alternative, the highly branched copolyester polyol is produced in stages by first polymerizing the molecular weight controlling agent and the highly branched monomers followed by polymerizing the chain extender. Thus, in the first step, the monomer mixture, which includes the highly branched monomers and the molecular weight controlling agent, is polymerized and then in the second step, the polymerization is continued with the addition of the chain extender. One example of the resulting highly branched copolyester polyol produced by such a two step process has the following structure:

Structure 2

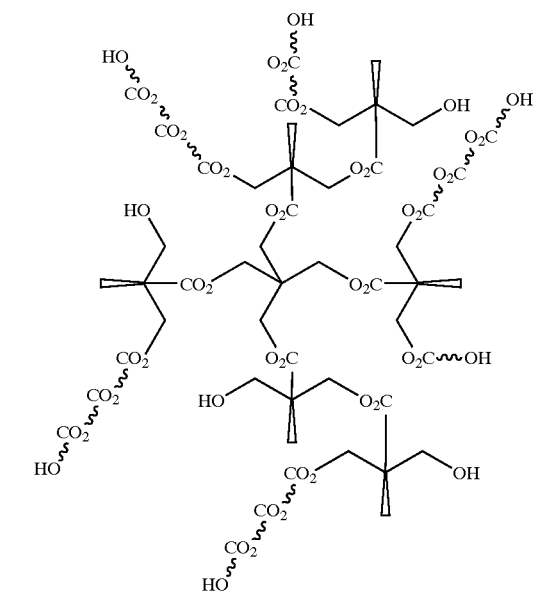

wherein the monomer mixture used to produce the highly branched copolyester polyol of Structure 2 includes caprolactone as a chain extender, dimethylol propionic acid as a hyper branching monomer and pentaerythritol as a molecular weight controlling agent.

Still another modification of the foregoing process includes producing the highly branched copolyester polyol in stages by first polymerizing the molecular weight controlling agent and the highly branched monomers and a portion of chain extender followed by polymerizing the remainder of the chain extender. Typically, the monomer mixture contains 10 to 90, preferably 20 to 60 and more preferably 30 to 40 weight percentage of the chain extender in the first stage, the remainder of the chain extender being added during the second stage.

One example of the resulting highly branched copolyester polyol produced by such a two step process has the following structure:

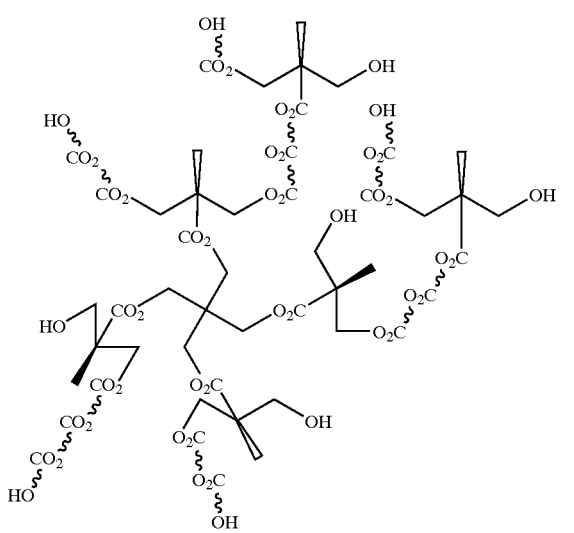

Structure 3 wherein the monomer mixture used to produce the highly branched copolyester polyol of Structure 3 includes caprolactone as a chain extender, dimethylol propionic acid as a hyper branching monomer and pentaerythritol as a molecular weight controlling agent.

The foregoing two step can be modified by first polymerizing the highly branched monomers and a portion of chain extender followed by polymerizing the remainder of the chain extender. Typically, the monomer mixture contains 10 to 90, preferably 20 to 60 and more preferably 30 to 40 weight percentage of the chain extender in the first stage, the remainder of the chain extender being added during the second stage.

In still another alternative, the highly branched copolyester polyol is produced in stages by first polymerizing the molecular weight controlling agent and a portion of the highly branched monomers and a portion of chain extender followed by polymerizing the remainder of the highly branched monomers and chain extender. Thus, in the first step, the monomer mixture, which includes a portion of the highly branched monomers, a portion of chain extender and the molecular weight controlling agent, is polymerized and then in the second step, the polymerization is continued with the addition of the remaining portions of the highly branched monomers and chain extender. Typically, the monomer mixture contains 10 to 90, preferably 20 to 60 and more preferably 30 to 40 weight percentage of the chain extender, and 10 to 90, preferably 20 to 80 and more preferably 40 to 60 weight percentage of the highly branched monomers in the first stage, the remainder of the chain extender and the highly branched monomers being added during the second stage.

In still another alternative, the highly branched copolyester polyol is produced in stages by first polymerizing portions of the molecular weight controlling agent, highly branched monomers and chain extender followed by polymerizing the remainder of said molecular weight controlling agent, highly branched monomers and chain extender. Thus, in the first step, the monomer mixture, which includes portions of the highly branched monomers, chain extender and the molecular weight controlling agent, is polymerized and then in the second step, the polymerization is continued with the addition of the remaining portions of the highly branched monomers, chain extender and the molecular weight controlling agent. Typically, the monomer mixture contains 10 to 90, preferably 20 to 60 and more preferably 30 to 40 weight percentage of the chain extender; contains 10 to 90, preferably 20 to 80 and more preferably 40 to 60 weight percentage of the molecular weight controlling agent; and 10 to 90, preferably 20 to 80 and more preferably 40 to 60 weight percentage of the highly branched monomers in the first stage, the remainder of the chain extender and the highly branched monomers being added during the second stage.

Another structure of the highly branched copolyester polyol produced from a monomer mixture containing a hyper branching monomer of the formula:

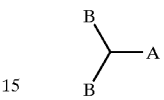

wherein A is carboxyl and B is hydroxyl as shown in Structure 4 below:

Structure 4

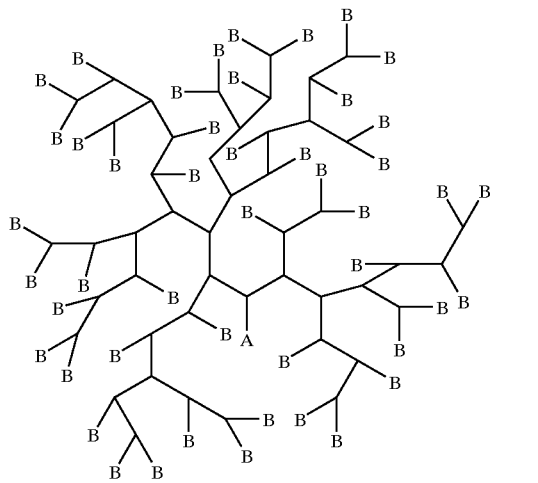

A preferred highly branched copolyester polyol is polymerized from a monomer mixture that includes:

one or more hyper branching monomers having the structural formula:

$(R^2O)_n—R^4—[C(CO)OR^3]_m$; and a chain extender selected from the group consisting of a hydroxy carboxylic acid, an ester of a hydroxy carboxylic acid and a combination thereof, said hydroxy carboxylic acid having the structural formula:

$R^5O—R^6—C(O)OR^7$, wherein:
$R^2$ and $R^5$ are H or $(O)CR^8$,
$R^3$ and $R^7$ are H, $C_{1-12}$ hydrocarbyl radical or hydroxyl substituted $C_{1-12}$ hydrocarbyl radical,
$R^4$ is $C_{1-12}$ hydrocarbyl radical having m+n free valencies,
$R^6$ is $C_{1-12}$ hydrocarbyl radical with two free valencies,
$R^8$ is H or $C_{1-200}$ hydrocarbyl radical and
n+m ranges from 3 to 6, and provided n or m is 1.

The aforedescribed monomer mixture preferably further includes a molecular weight controlling agent having the formula:

$R^1-Z_k$, wherein:

R$^1$ is C$_{1-200}$ hydrocarbyl radical with free valencies ranging from 1 to 6, Z is a hydroxyl, carboxyl, amine or epoxy group, and k ranges from 1 to 6.

The highly branched copolyester polyol by the aforedescribed processes can be prepared by a batch process or by a continuous polymerization process.

Generally, the aforedescribed processes for forming the copolyester polyol take place at reaction temperatures in the range of from 60° C. to 200° C. and preferably, in the range of from 80° C. to 170° C.; with typical reaction times ranging from 1 hour to 24 hours, preferably 1 hour to 4 hours. The polymerization can be catalyzed by conventional polyester catalysts, such as tin (II) di(2-ethylhexanoate)(Sn (O$_2$CC$_7$H$_{15}$)$_2$).

Other Additives

In addition to the highly branched copolyester polyol, the lacquer can contain up to 98% by weight, preferably in the range of 50% to 95% by weight of an acrylic polymer, polyester, alkyd resin, acrylic alkyd resin, cellulose acetate butyrate, an iminated acrylic polymer, ethylene vinyl acetate co-polymer, nitrocellulose, plasticizer or a combination thereof, all weight percentages being based on the total weight of the lacquer solids.

Useful acrylic polymers having a weight average molecular weight ranging from 3,000 to 100,000 and a Tg ranging from 0° C. to 100° C. are conventionally polymerized from a monomer mixture that can include:

one or more of the following monomers:

an alkyl(meth)acrylate, for example, methyl(meth) acrylate, butyl (meth)acrylate, ethyl(meth)acrylate, 2-ethyl hexyl(meth)acrylate; a hydroxy alkyl(meth)acrylate, for example, hydroxy ethyl(meth)acrylate, hydroxy propyl (meth)acrylate, hydroxy butyl(meth)acrylate; (meth)acrylic acid; styrene; and alkyl amino alkyl(meth)acrylate, for example diethylamino ethyl(meth)acrylate or t-butyl aminoethyl methacrylate; and one or more of the following drying oils:

vinyl oxazoline drying oil esters of linseed oil fatty acids, tall oil fatty acids, and tung oil fatty acids.

One preferred polymer is polymerized from a monomer mixture that contains an alkyl (meth)acrylate, hydroxy alkyl acrylate, alkylamino alkyl acrylate and vinyl oxazoline ester of drying oil fatty acids.

Suitable iminiated acrylic polymers can be obtained by reacting acrylic polymers having carboxyl groups with propylene imine.

Typically useful polyesters have a weight average molecular weight ranging from 1500 to 30,000 and a Tg in the range of −50° C. to +100° C. Some of the other suitable polyesters are also listed in U.S. Pat. No. 6,221,494 on column 5 and 6, which is incorporated herein by reference. The suitable polyester is the esterification product of an aliphatic or aromatic dicarboxylic acid, a polyol, a diol, an aromatic or aliphatic cyclic anhydride and a cyclic alcohol. One preferred polyester is the esterification product of adipic acid, trimethylol propane, hexanediol, hexahydrophathalic anhydride and cyclohexane dimethylol.

Suitable cellulose acetate butyrates are supplied by Eastman Chemical Co., Kingsport, Tenn. under the trade names CAB-381-20 and CAB-531-1.

A suitable ethylene-vinyl acetate co-polymer (wax) is supplied by Honeywell Specialty Chemicals—Wax and Additives, Morristown, N.J., under the trade name A-C® 405 (T) Ethylene—Vinyl Acetate Copolymer.

Suitable nitrocellulose resins preferably have a viscosity of about 1/2–6 seconds. Preferably, a blend of nitrocellulose resins is used. Optionally, the lacquer can contain ester gum and castor oil.

Suitable alkyd resins are the esterification products of a drying oil fatty acid, such as linseed oil and tall oil fatty acid, dehydrated castor oil, a polyhydric alcohol, a dicarboxylic acid and an aromatic monocarboxylic acid. Typical polyhydric alcohols that can be used to prepare the alkyd resin used in this invention are glycerine, pentaerythritol, trimethylol ethane, trimethylol propane; glycols, such as ethylene glycol, propylene glycol, butane diol and pentane diol. Typical dicarboxylic acids or anhydrides that can be used to prepare the alkyd resin are phthalic acid, phthalic anhydride, isophthalic acid, terephthalic acid maleic, and fumaric acid. Typical monocarboxylic aromatic acids are benzoic acid, paratertiary butylbenzoic acid, phenol acetic acid and triethyl benzoic acid. One preferred alkyd resin is a reaction product of an acrylic polymer and an alkyd resin.

Suitable plasticizers include butyl benzyl phthalate, dibutyl phthalate, triphenyl phosphate, 2-ethylhexylbenzyl phthalate, dicyclohexyl phthalate, diallyl toluene phthalate, dibenzyl phthalate, butylcyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl hexyl ester of hexamethylene diphthalate, and di(methyl cyclohexyl) phthalate. One preferred plasticizer of this group is butyl benzyl phthalate.

If desired, the lacquer can include metallic driers, chelating agents, or a combination thereof. Suitable organometallic driers include cobalt naphthenate, copper naphthenate, lead tallate, calcium naphthenate, iron naphthenate, lithium naphthenate, lead naphthenate, nickel octoate, zirconium octoate, cobalt octaoate, iron octoate, zinc octoate, and alkyl tin dilaurates, such as dibutyl tin dilaurate. Suitable chelating agents include aluminum monoisopropoxide monoversatate, aluminum (monoiospropyl)phthalate, aluminum diethoxyethoxide monoversatate, aluminum trisecondary butoxide, aluminum diisopropoxide monoacetacetic ester chelate and aluminum isopropoxide.

Additional details of the foregoing additives are provided in U.S. Pat. Nos., 3,585,160, 4,242,243, 4,692,481, and U.S. Re. Pat. No. 31.309, which are incorporated therein by reference.

The lacquer of the present invention can further contain at least one organic solvent typically selected from the group consisting of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; glycol ether esters, such as, propylene glycol monomethyl ether acetate; and alcohols, such as isopropanol and butanol. The amount of organic solvent added depends upon the desired solids level as well as the desired amount of VOC of the lacquer.

The solids level of the lacquer of the present invention can vary in the range of from 5 percent to 100 percent, preferably in the range of from 7 percent to 80 percent and more preferably in the range of from 10 percent to 60 percent, all percentages being based on the total weight of the lacquer.

To improve weatherability of a clear coating, 0.1 to 5 weight percent, preferably 1 to 2.5 weight percent and more preferably 1.5 to 2 weight percent, based on the weight of the lacquer solids, of an ultraviolet light stabilizer or a combination of ultraviolet light stabilizers and absorbers can be added. These stabilizers include ultraviolet light absorbers, screeners, quenchers and specific hindered amine light stabilizers. Also, about 0.1 to 5% by weight, based on the total weight of the lacquer solids, of an antioxidant can be added. Most of the foregoing stabilizers are supplied by Ciba Specialty Chemicals, Tarrytown, N.Y.

In use, a layer of the lacquer is typically applied to a substrate by conventional techniques, such as, spraying, electrostatic spraying, roller coating, dipping or brushing. If used as a clear coating, a layer having a thickness in the range of from 25 micrometers to 76 micrometers is applied over a metal substrate, such as, automotive body, which is often pre-coated with other coating layers, such as an electrocoat, primer and a basecoat. The lacquer can be dried at ambient temperatures or can be dried upon application for about 2 to 60 minutes at elevated drying temperatures ranging from about 50° C. to 100° C. The lacquer can contain pigments and be applied as a mono coat or a basecoat layer over a primed substrate.

Typically, a layer of conventional clear coating composition is applied by conventional techniques, such as, spraying, electrostatic spraying, roller coating, dipping or brushing over a basecoat lacquer described above. Generally, a layer of the basecoat lacquer is flashed for 1 minute to two hours under ambient or elevated temperatures before the application of the clear coating composition. Suitable clear coating compositions can include two-pack isocyanate crosslinked compositions, such as 72200S ChromaPremier® Productive Clear blended with an activator, such as 12305S ChromaPremier® Activator, or 3480S Low VOC Clear composition activated with 194S Imron Select® Activator. Isocyanate free crosslinked clear coating compositions, such as 1780S Iso-Free Clearcoat activated with 1782S Converter and blended with 1775S Mid-Temp Reducer are also suitable. Suitable clear lacquers can include 480S Low VOC Ready to Spray Clear composition. All the foregoing clear coating compositions are supplied by DuPont Company, Wilmington, Del.

If desired, the composition can be pigmented to form a colored monocoat or basecoat, or primer. About 0.1% to 200% by weight, based on the weight of the lacquer solids, of conventional colored and flake pigments can be added using conventional techniques in which a mill base containing pigments, dispersants, additives and solvents is first formed. Typically, the mill base is then mixed with the remaining components of the lacquer to form a pigmented lacquer. This composition can be applied and dried as described above.

Suitable flake pigments include bright aluminum flake, extremely fine aluminum flake, medium particle size aluminum flake, and bright medium coarse aluminum flake; micaflake coated with titanium dioxide pigment also known as pearl pigments. Suitable colored pigments include titanium dioxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, and molybdate orange red.

The lacquer of the present invention is also suitable for providing coatings on a variety of substrates, such as metal, plastic, composite, wood and concrete substrates. The present lacquer is especially suitable for providing pigmented basecoats in automotive OEM or refinish applications typically used in coating autobodies.

These lacquers are also suitable as clear or pigmented coatings in industrial and maintenance coating applications.

The lacquer of the present invention can also contain conventional additives, such as, stabilizers, rheology control agents, flow agents, toughening agents, fillers and hollow spheres. Such additional additives will depend upon the intended use of the lacquer. Fillers, hollow spheres, pigments, and other additives that would adversely effect the clarity of the coating are not typically included if the lacquer is intended to be used as a clear coating.

Testing Procedures

The following test procedures were used for generating data reported in the examples below:

Chip Resistance Test

The test utilizes a gravelometer and follows the procedure described in ASTM-D-3170-87 using a 55° panel angle with panels and stones kept in the freezer for a minimum of 2 hours prior to chipping (panels were tested with 0.47 liter (1 pint)/1.42 liters (3 pints) of stones after a 30 minute @ 60° C. (140° F.) bake then air drying for an additional 7 days (dry chip test) and also baking for 30 minutes at 60° C. (140° F.) then air drying for an additional 7 days followed by an additional 96 hours in a humidity cabinet (ASTM-D-2247-99) at 100% relative humidity (wet chip test).

Gloss Measurement

Gloss was measured at 20° and 60° using a Byk-Gardener Glossmeter.

Distinctness of Image (DOI)

DOI was measured using a Dorigon II (HunterLab, Reston, Va.).

The invention is illustrated by the following Examples. All parts and percentages are on a weight basis unless otherwise noted.

EXAMPLES

The following highly branched copolyester polyol solutions were prepared and used to form coating compositions.

Highly Branched Copolyester Polyol-solution 1

A highly branched copolyester polyol was synthesized by esterifying dimethylolpropionic acid and ε-caprolactone with a Tin(II) Catalyst as follows:

The following constituents were charged into a 3 liter three-neck flask equipped with a mechanical stirrer, thermocouple, short path distillation head with a water condenser under nitrogen flow: dimethylolpropionic acid (DMPA, 320 g, 2.39 mole), ε-caprolactone (640 g, 5.6 mole), tin (II) di(2-ethylhexanoate)($Sn(O_2CC_7H_{15})_2$), 6 g, 0.015 mole), xylene (40 ml) and heated at 180° C. The reaction progress was monitored by the acid number measurements and by the water volume collected. After 7 hours, 32 ml water was collected, 1 g sample was withdrawn and dissolved in 10 ml DMSO (dimethyl sulfoxide), and the acid number (8.3) was determined by titration with 0.1 N KOH in methanol. The hot, viscous, slightly yellow clear polymer was poured out of the reactor into a container. The polymer had $M_n$ 13,100, $M_w/M_n$ of 3.1 as determined by GPC vs. polystyrene standards in THF (tetrahydrofuran) at room temperature, $T_g$=−43° C. determined by DSC (Differential Scanning Calorimetry), and a calculated —OH EW (hydroxyl equivalent weight) of 340.

To reduce the viscosity, the copolyester polyol was dissolved in propylene glycol monomethyl ether acetate to a weight solids of 64%.

Highly Branched Copolyester Polyol-solution 2

A highly branched copolyester polyol was synthesized by esterifying dimethylolpropionic acid and ε-caprolactone and pentaerythritol with a tin (II) catalyst as follows:

The following constituents were charged into a 3 liter three-neck flask equipped with a mechanical stirrer, thermocouple, short path distillation head with a water condenser under nitrogen flow: dimethylolpropionic acid (DMPA, 400 g, 2.98 mole), pentaerythritol (32.4 g, 0.24 mole), tin (II) di(2-ethylhexanoate)(Sn(O$_2$CC$_7$H$_{15}$)$_2$), 6 g, 0.015 mole), xylene (10 g) and heated at 180° C. The reaction progress was monitored by the acid number measurements and by the water volume collected. After 12 hours, 51 ml water was collected, 1 g sample was withdrawn and dissolved in 10 ml DMSO, and the acid number (3.7) was determined by titration with 0.1 N KOH in methanol. The reaction heating was reduced to 120° C. and ε-caprolactone (800 g, 7.0 mole) was slowly added within 3–5 min. After 85 min., 0.1 g sample was withdrawn, 0.01 g of undecane was added and dissolved in 1 ml THF, and then analyzed by GC(Gas Chromatography) to verify essentially complete conversion of ε-caprolactone. The hot, viscous, slightly yellow clear polymer was poured out of the reactor into a container. The polymer had $M_n$ 5,500, $M_w/M_n$ of 2.1 as determined by GPC vs. polystyrene standards in DMAC at 135° C., intrinsic viscosity 0.082 dL/g, $T_g$=−47° C. by DSC, and a calculated —OH of EW 350.

To reduce the viscosity, the copolyester polyol was dissolved in propylene glycol monomethyl ether acetate to a weight solids of 64%.

Highly Branched Copolyester Polyol-solution 3

A highly branched copolyester polyol was synthesized by esterifying dimethylolpropionic acid and ε-caprolactone and pentaerythritol with a tin (II) catalyst as follows:

The following constituents were charged into a 3 liter three-neck flask equipped with a mechanical stirrer, thermocouple, short path distillation head with a water condenser under nitrogen flow: dimethylolpropionic acid (DMPA, 250 g, 1.86 mole), pentaerythritol (20.2 g, 0.15 mole), tin (II) di(2-ethylhexanoate)(Sn(O$_2$CC$_7$H$_{15}$)$_2$), 6 g, 0.015 mole), xylene (10 g) and heated at 180° C. The reaction progress was monitored by the acid number measurements and by the water volume collected. After 11 hours, 30 ml water was collected, 1 g sample was withdrawn and dissolved in 10 ml DMSO, and the acid number (3.9) was determined by titration with 0.1 N KOH in methanol. The reaction heating was reduced to 120° C. and ε-caprolactone (800 g, 7.0 mole) was slowly added within 3–5 min. After 80 min., 0.1 g sample was withdrawn and 0.01 g of undecane was added, dissolved in 1 ml THF and then was analyzed by GC to verify essentially complete conversion of ε-caprolactone. The hot, viscous, slightly yellow clear polymer was poured out of the reactor into a container. The polymer had $T_g$=−51° C. by DSC, and a calculated —OH EW of 490.

To reduce the viscosity, the copolyester polyol was dissolved in propylene glycol monomethyl ether acetate to a weight solids of 64.5%.

Highly Branched Copolyester Polyol-solution 4

A highly branched copolyester polyol was synthesized by esterifying dimethylolpropionic acid, pentaerythritol and ε-caprolactone as follows:

The following constituents were charged into a 12-liter reactor equipped with a mechanical stirrer, thermocouple, short path distillation head with a water separator under nitrogen flow:

| Dimethylolpropionic acid (DMPA) | 2063.4 |
| Pentaerythritol (PE) | 167.1 |
| Tin (II) 2-ethylhexanoate | 31.0 |
| Xylene | 108.3 |

The reaction mixture was heated to its reflux temperature and the water of reaction was collected from the water separator. The reaction progress was monitored by the amount of water collected and the reaction temperature was not allowed to exceed 185° C. An additional 20 g of xylene was added throughout the reaction to maintain the reflux temperature below 185° C. When the amount of water collected approached theoretical (277 g), acid number measurements were used to determine the end point, which was an acid number of less than 5. At a measured acid number of 1.7, the reactor was allowed to cool to 120° C. Then, 4126.8 g of ε-caprolactone was added slowly over a 15–20 minute period through an addition funnel. The reactor was held at 120° C. until the solids exceeded 95%. Then the reactor was allowed to cool to 90° C. and the resulting polymer solution was thinned with 1391.8 g methyl ethyl ketone. Forced air was used to cool the reactor to below 50° C.

The polymer had a Mn of 5035, Mw/Mn of 1.68 (determined by GPC using polystyrene as a standard with a SEC high MW column), an OH# equal to 184.5, and a calculated —OH EW of 300.2. The polymer solution had 80.2% solids content, a Gardner Holdt viscosity of V+1/4, and the final acid number was 2.1 corrected for solids.

Highly Branched Copolyester Polyol-solution 5

A random highly branched copolyester polyol was synthesized by esterifying dimethylolpropionic acid, pentaerythritol and ε-caprolactone as follows:

The following constituents were charged into a 12-liter reactor equipped with a mechanical stirrer, thermocouple, short path distillation head with a water separator under nitrogen flow:

| Dimethylolpropionic acid (DMPA) | 1668.8 |
| Pentaerythritol (PE) | 67.6 |
| Tin (II) 2-ethylhexanoate | 25.1 |
| ε-Caprolactone (CL) | 3337.6 |
| Xylene | 87.6 |

The reaction mixture was heated to its reflux temperature and the water of reaction was collected from the water separator. The reaction progress was monitored by the amount of water collected and the reaction temperature was not allowed to exceed 185° C. An additional 40 g of xylene was added throughout the reaction to maintain the reflux temperature below 185° C. When the amount of water collected approached theoretical amount of 224 g, acid number measurements were used to determine the end point, which was an acid number of less than 5. At a measured acid number of 3.0, the reactor was allowed to cool to 90° C. The reactor was held at 120° C. until reaction solids exceeded 95%. The reactor was allowed to cool to 90° C. and the polymer solution was thinned with 2537.3 g of polyethyleneglycol monomethyl ether. Forced air was used to cool the reactor to below 50° C.

The polymer had a Mn of 7065, Mw/Mn of 3.27 (determined by GPC using polystyrene as a standard with a SEC high MW column), an OH# equal to 166.8, and a calculated —OH EW of 335.8. The polymer solution has 65.6% solids content, a Gardner Holdt viscosity of V+1/2, and the final acid number of 2.5.

Basecoat Lacquers Examples

Basecoat Preparation

A Red Metallic Composite Tinting A was produced by mixing together, on an air mixer, the components shown below supplied by DuPont Company, Wilmington, Del.:

| Component | Description | Grams |
|---|---|---|
| 864J | DuPont MasterTint ® Magenta Tinting | 7884.55 |
| 813J | DuPont MasterTint ® Medium Coarse Aluminum Tinting | 1010.06 |
| | Total | 8894.61 |

A Red Metallic Composite Tinting B was produced by mixing together, on an air mixer, the components shown below supplied by DuPont Company, Wilmington, Del.:

| Component | Description | Grams |
|---|---|---|
| 864J | DuPont MasterTint ® Magenta Tinting | 5870.26 |
| 813J | DuPont MasterTint ® Medium Coarse Aluminum Tinting | 924.35 |
| | Total | 6794.61 |

A Solvent Blend C was prepared by mixing the following ingredients on an air mixer:

Solvent Blend C

| Component | Grams |
|---|---|
| Butyl acetate | 7964.60 |
| Methyl amyl ketone | 3413.40 |
| Total | 11378.00 |

A CAB Solution D, shown below, was produced by slowly adding cellulose acetate butyrate to solvent while mixing on an air mixer:

| Component | Description | Grams |
|---|---|---|
| Solvent Blend C | Solvent Blend | 5055.57 |
| CAB-381-20* | cellulose acetate butyrate | 669.12 |
| CAB-531-1* | cellulose acetate butyrate | 223.04 |
| | Total | 5947.73 |

*Supplied by Eastman Chemical Co., Kingsport, Tennessee.

Wax Dispersion E was produced as follows:

To a reactor filled with nitrogen, 5508.25 parts by weight of xylene were added, followed by 826.50 parts by weight of A-C® 405 (T) Ethylene—Vinyl Acetate Copolymer supplied by Honeywell Specialty Chemicals—Wax and Additives, Morristown, N.J. This mixture was heated, under vigorous agitation, to 68° C. (154° F.), and held for 60 minutes. While still mixing, 7472.47 parts by weight of butyl acetate with a temperature between 66.7° C. to 68.9° C. (152° F. to 156° F.) were added over 10 minutes at a rate of 751.7 parts by weight per minute. The temperature dropped to approximately 50° C. (122° F.) and the batch was mixed for an additional 30 minutes at this temperature. The batch was then cooled to a maximum of 30° C. (86° F.), with mixing, mixed for an additional hour and then filtered.

Basecoat lacquers of Comparative Examples 1 and 3 and Examples 2 and 4 of the present invention were prepared by adding the components listed in Table 1 and then shaking on a mechanical shaker:

TABLE I

| Component | Comp. Ex. 1 | Ex. 2 | Comp. Ex. 3 | Ex. 3 |
|---|---|---|---|---|
| Red Metallic Composite Tinting A | 518.42 | 518.42 | | |
| Red Metallic Composite Tinting B | | | 387.16 | 387.16 |
| ChromaPremier ® 62320F | 453.30 | | 579.37 | |
| Basecoat Binder | | | | |
| CAB Solution D | | 156.15 | | 200.34 |
| Highly Branched Copolyester Polyol-Solution 5 | | 35.86 | | 45.65 |
| Wax Dispersion E | | 261.86 | | 334.69 |
| ChromaSystems ® 7175S Basemaker | 828.27 | | 833.47 | |
| Solvent Blend C | | 827.72 | | 832.16 |
| Total | 1799.99 | 1800.01 | 1800.00 | 1800.00 |

Panel Preparation

DuPont Variprime® Self-Etching Primer was prepared by mixing together 600 grams of 615S Variprime® with 400 grams of 616S Converter, all supplied by DuPont Company, Wilmington, Del. The Self-Etching Primer was sprayed according to the instructions in the ChromaSystem™ Technical Manual supplied by DuPont Company, Wilmington, Del. over cold rolled steel panels (sanded with Norton 80-D sandpaper supplied by Norton, Worcester, Mass., and wiped twice with DuPont 3900S First Klean™ supplied by DuPont Company, Wilmington, Del.) resulting in a film thickness of 25.4 to 28 micrometers (1.0 to 1.1 mils). The ChromaPremier® type basecoats (Samples 1 to 4) were then applied per the ChromaPremier® Basecoat instructions in the ChromaSystem™ Technical Manual, resulting in film thicknesses of 51 to 56 micrometers (2.0 to 2.2 mils). After flashing, 72200S ChromaPremier® Productive Clear (528 grams 72200S ChromaPremier® Productive Clear blended with 187 grams 12305S ChromaPremier® Activator and 185 grams 12375S ChromaPremier® Medium Reducer, all supplied by DuPont Company, Wilmington, Del.) was applied per the instructions in the ChromaSystem™ Technical Manual, resulting in a film thickness of 58 to 61 micrometers (2.3 to 2.4 mils). After flashing, the panels were baked for 30 minutes at 60° C. (140° F.). The panels were then aged for one week at approximately 25° C. @ 50% relative humidity prior to testing.

Test Results

Below in Table 2 are the gloss (using a BYK-Gardner glossmeter) and distinctness of image (using a Dorigon II meter) values on the basecoat/clearcoat panels:

TABLE 2

| Basecoat* | 20° Gloss | 60° Gloss | DOI |
|---|---|---|---|
| Comp. Ex. 1 | 78.8 | 89.6 | 96.7 |
| Ex. 2 | 86.2 | 93.3 | 93.8 |
| Comp. Ex. 3 | 89.4 | 93.8 | 97.5 |
| Ex. 4 | 87.9 | 93.7 | 96.3 |

*All basecoats were further coated with the clear coat described above in panel preparation.

The presence of hyperbranch resin in the basecoats did not affect the quality of the coating appearance.

The basecoat/clear coat panels were subjected to the chip resistance test described earlier. The results are shown in Table 3 below:

TABLE 3

| Basecoat* | Dry Chip Resistance | | Wet Chip Resistance | |
|---|---|---|---|---|
| | 1 Pint | 3 Pints | 1 Pint | 3 Pints |
| Comp. Ex. 1 | 4 BV | 4 BV | 3 BV | 2 BV |
| Ex. 2 | 6 BV | 5 BV | 6 VV | 5 VV |
| Comp. Ex. 3 | 5 BB/BV | 4 BB/BV | 3 VV | 3 VV |
| Ex. 4 | 6 VV | 6 VV | 5 VV | 6 VV |

*All basecoats were further coated with the clear coat described above in panel preparation.

Nomenclature for Table 3:
 V V means adhesion loss between layers of DuPont Variprime® Self-Etching Primer
 BB means adhesion loss between layers of basecoat
 BV means adhesion loss between basecoat and DuPont Variprime® Self-Etching Primer The data showed that the panels' chip performance particularly benefited from the addition of hyperbranch resin to the lacquer basecoat.

Table 4 below shows the results of the X-hatch and grid hatch adhesion test (ASTM D3359) after 96 hours in the humidity cabinet (ASTM-D-2247-99) at 100% relative humidity. Readings were taken before exposure (initially), immediately after removal from the humidity cabinet (wet), and after 24 hours recovery.

TABLE 4

| Basecoat* | X-Hatch Adhesion | | | Grid Hatch Adhesion | | | Blister |
|---|---|---|---|---|---|---|---|
| | Initial | Wet | 24 Hrs.** | Initial | Wet | 24 Hrs.** | |
| Comp. Ex. 1 | 10− | 0 BV | 10− | 9 BV | 0 BV | 7 BV | 4 M |
| Ex. 2 | 10 | 10 | 10 | 8 BV | 6 BV | 8 BV | 2 F |
| Comp. Ex. 3 | 10 | 7 BV | 10− | 8 BV | 5 BV | 8 BV | 6 F |
| Ex. 4 | 10 | 10 | 10− | 10 | 7 BV | 8 BV | 2 F |

*All basecoats were further coated with the clear coat described above in panel preparation.
**After 24 hours of recovery.

Nomenclature for Table 4:
 V V means adhesion loss between layers of DuPont Variprime® Self-Etching Primer
 BV means adhesion loss between basecoat and DuPont Variprime® Self-Etching Primer
 Blistering ratings are based on ASTM D714-87

The data showed that the panels' moisture resistance particularly benefited from the addition of hyperbranch resin to the lacquer basecoats.

What is claimed is:

1. A lacquer comprising a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20.

2. The lacquer of claim 1 wherein said monomer mixture further comprises a molecular weight controlling agent having in the range of 1 to 6 functionalities selected from the group consisting of hydroxyl, amine, epoxide, carboxyl and a combination thereof.

3. The lacquer of claim 1 wherein when said monomer mixture contains hyper branching monomer having two carboxyl groups and one hydroxyl group or three carboxyl groups and one hydroxyl group, said highly branched copolyester polyol is further reacted with monoepoxy or diol to provide said highly branched copolyester polyol with said range of hydroxyl groups.

4. The lacquer of claim 1 wherein said hyper branching monomer is dialkylol propionic acid and said lactone is caprolactone.

5. The lacquer of claim 2 wherein said hyper branching monomer is dialkylol propionic acid, said lactone is caprolactone and said molecular weight controlling agent is pentaerythritol or trimethylol propane.

6. The lacquer of claim 2 wherein said hyper branching monomer is dimethylol propionic acid, said lactone is caprolactone and said molecular weight controlling agent is pentaerythritol.

7. The lacquer of claim 1 or 2 wherein said lacquer comprises an acrylic polymer, polyester, alkyd resin, acrylic alkyd resin, cellulose acetate butyrate, an iminated acrylic polymer, ethylene-vinyl acetate co-polymer, nitrocellulose, plasticizer or a combination thereof.

8. The lacquer of claim 1 or 2 wherein said lacquer further comprises metallic driers, chelating agents, or a combination thereof.

9. The lacquer of claim 1 or 2 comprising in the range 2 weight percent to 100 weight percent of said highly branched copolyester polyol.

10. The lacquer of claim 1 or 2 comprising in the range 5 weight percent to 50 weight percent of said highly branched copolyester polyol.

11. The lacquer of claim 1 or 2 comprising a pigment, flake or a combination thereof.

12. The lacquer of claim 1 wherein said highly branched copolyester polyol is produced by polymerizing said chain extender and highly branched monomers in one step.

13. The lacquer of claim 2 wherein said highly branched copolyester polyol is produced by polymerizing said chain extender, molecular weight controlling agent and highly branched monomers in one step.

14. The lacquer of claim 1 wherein said highly branched copolyester polyol is produced in stages by first polymerizing said highly branched monomers followed by polymerizing said chain extender.

15. The lacquer of claim 2 wherein said highly branched copolyester polyol is produced in stages by first polymerizing said molecular weight controlling agent and said highly branched monomers followed by polymerizing said chain extender.

16. The lacquer of claim 1 wherein said highly branched copolyester polyol is produced in stages by first polymerizing said highly branched monomers and a portion of said chain extender followed by polymerizing the remainder of said chain extender.

17. The lacquer of claim 2 wherein said highly branched copolyester polyol is produced in stages by first polymerizing said molecular weight controlling agent and said highly branched monomers and a portion of said chain extender followed by polymerizing the remainder of said chain extender.

18. The lacquer of claim 2 wherein said highly branched copolyester polyol is produced in stages by first polymerizing said molecular weight controlling agent and a portion of said highly branched monomers and a portion of said chain extender followed by polymerizing the remainder of said highly branched monomers and chain extender.

19. The lacquer of claim 2 wherein said highly branched copolyester polyol is produced in stages by first polymerizing portions of said molecular weight controlling agent, highly branched monomers and said chain extender followed by polymerizing the remainder of said molecular weight controlling agent, highly branched monomers and chain extender.

20. A lacquer comprising a highly branched copolyester polyol polymerized from a monomer mixture comprising:

one or more hyper branching monomers having the structural formula:

$(R^2O)_n-R^4-[C(CO)O\ R^3]_m$; and a chain extender selected from the group consisting of a hydroxy carboxylic acid, an ester of a hydroxy carboxylic acid and a combination thereof, said hydroxy carboxylic acid having the structural formula:

$R^5O-R^6-C(O)O\ R^7,$ wherein:
$R^2$ and $R^5$ are H or (O)C $R^8$,
$R^3$ and $R^7$ are H, $C_{1-12}$ hydrocarbyl radical or hydroxyl substituted $C_{1-12}$ hydrocarbyl radical,
$R^4$ is $C_{1-12}$ hydrocarbyl radical having m+n free valencies,
$R^6$ is $C_{1-12}$ hydrocarbyl radical with two free valencies,
$R^8$ is H or $C_{1-200}$ hydrocarbyl radical and
n+m ranges from 3 to 6, and provided n or m is 1.

21. The lacquer of claim 20 wherein said monomer mixture further comprises a molecular weight controlling agent having the formula:

$R^1-Z_k,$ wherein:
$R^1$ is $C_{1-200}$ hydrocarbyl radical with free valencies ranging from 1 to 6,
Z is a hydroxyl, carboxyl, amine or epoxy group, and k ranges from 1 to 6.

22. A lacquer comprising a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group; and a molecular weight controlling agent having in the range of 1 to 6 functionalities selected from the group consisting of hydroxyl, amine, epoxide, carboxyl and a combination thereof; wherein the weight ratio of the hyper branching monomer to the chain extender in said monomer mixture ranges from 1/0.3 to 1/20.

23. A lacquer comprising a highly branched copolyester polyol polymerized from a monomer mixture comprising:

(a) a molecular weight controlling agent having the formula:

$R^1-Z_k,$ wherein:
$R^1$ is $C_{1-200}$ hydrocarbyl radical with free valencies ranging from 1 to 6,
Z is a hydroxyl, carboxyl, amine or epoxy group, and k ranges from 1 to 6;

(b) one or more hyper branching monomers having the structural formula:

$(R^2O)_n-R^4-[C(CO)O\ R^3]_m$; and (c) a chain extender selected from the group consisting of a hydroxy carboxylic acid, an ester of a hydroxy carboxylic acid and a combination thereof, said hydroxy carboxylic acid having the structural formula:

$R^5O-R^6-C(O)O\ R^7,$ wherein:
$R^2$ and $R^5$ are H or (O)C $R^8$,
$R^3$ and $R^7$ are H, $C_{1-12}$ hydrocarbyl radical or hydroxyl substituted $C_{1-12}$ hydrocarbyl radical,
$R^4$ is $C_{1-12}$ hydrocarbyl radical having m+n free valencies,
$R^6$ is $C_{1-12}$ hydrocarbyl radical with two free valencies,
$R^8$ is H or $C_{1-200}$ hydrocarbyl radical and
n m ranges from 3 to 6, and provided n or m is 1.

* * * * *